July 26, 1960 — C. J. POZGAY — 2,946,390
HELICOPTER BLADE CONTROL DEVICE
Filed Jan. 30, 1957

INVENTOR
CARL JOSEPH POZGAY.
ATTORNEY

United States Patent Office 2,946,390
Patented July 26, 1960

2,946,390

HELICOPTER BLADE CONTROL DEVICE

Carl Joseph Pozgay, 96 Gladstone Ave., West Islip, N.Y.

Filed Jan. 30, 1957, Ser. No. 637,251

1 Claim. (Cl. 170—160.13)

This invention relates to the art of helicopter control devices and particularly concerns a device for controlling the pitch of the overhead rotating wing blades.

A serious problem in helicopter flight control resides in the fact that as one blade of a two-blade mechanism moves in the direction of flight against the strong resistance of the air, the other blade moves in the opposite direction with relatively little air resistance. Since the pitch of both blades is the same, the first mentioned blade will effect a strong lifting action while the second blade will provide a relatively weak lifting force. The consequence of this inequality of lifting forces is an unbalance or unsettling of equilibrium resulting in a radical departure from level flight. Furthermore, the unbalanced forces thus produced tend to prevent the craft from traveling a straight course.

The principal object of this invention is the provision of means for automatically changing the pitch of the helicopter wings or blades in opposite directions to counter-act the differential in lifting forces which are exerted by said wings or blades depending upon their direction of travel with respect to the direction of travel of the helicopter itself.

As the leading blade heads into the rearwardly moving air, it tends to bite into the air and to effect a relatively strong lifting force. The opposite blade moves in the opposite direction, namely, in the direction of the air flow, and the lifting force is correspondingly weak. Consequently, the leading blade will tend to pivot upwardly relative to the axis of rotation.

These opposite pivotal movements result in the actuation of a pair of gear mechanisms, one for each blade, whereby the leading blade is caused to turn about its longitudinal axis to reduce its angle of attack and thereby to reduce its bite into the air. By the same token, the angle of attack of the opposite blade is increased so as to increase its bite into the air. The effect is to lessen the lifting force provided by the leading blade and to increase the lifting force of the opposite blade so that both blades will exert substantially the same lifting force irrespective of their relative directions of travel.

The invention will be best understood from the following detailed description taken together with the drawing, wherein.

Figures 1, 2:
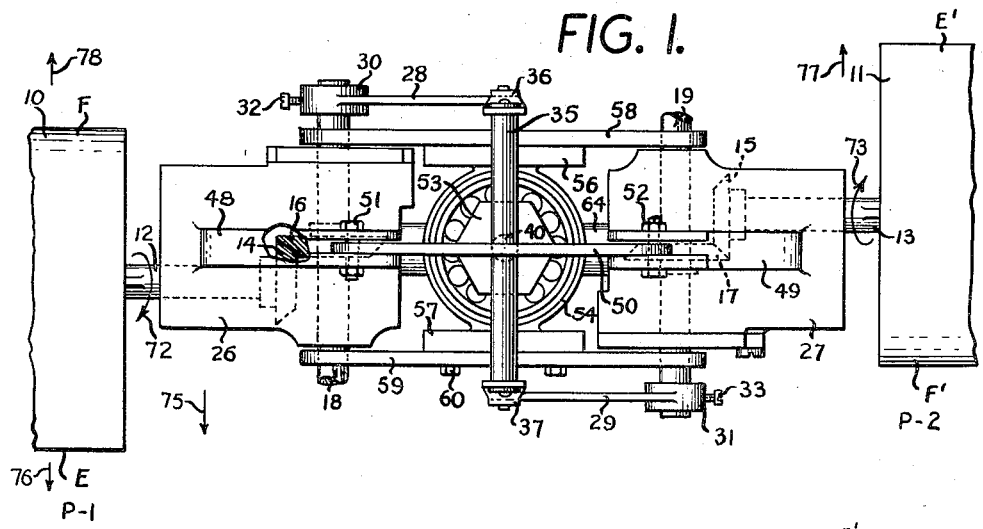
Fig. 1 is a top plan view of the control device with attached wing blades.
Fig. 2 is a front elevational view of the device.

In Figs. 1 and 2 are shown a pair of wide flat wing blades 10, 11. The blades have fine edges at the ends E, E' and taper outwardly to the broader rounded ends F, F'. Attached to the wing blades are the shafts 12, 13. Shaft 12 terminates in a bevel gear 14 and shaft 13 terminates in bevel gear 15. Bevel gears 16, 17 mesh with bevel gears 14, 15. Gears 16, 17 are mounted on shafts 18, 19 which are rotatable to a limited extent in the shaft supports or housing members 26, 27. Portions of shafts 12, 18 are disposed in a shaft support or housing 26 and portions of shafts 13, 19 are disposed in a shaft supporting or housing 27. A crank 28 terminating in a collar 30 is secured by a set screw 32 to shaft 18. A corresponding crank 29 and collar 31 is secured by set screw 33 to shaft 19. Links 36, 37 are pivotally joined to cranks 28, 29 and are secured to opposite ends of a cross shaft 35. A rod or bar 40 is perpendicularly attached to shaft 35. Rod 40 moves in the sleeve 41. The sleeve has a longitudinal slot 42 in which rides the guide key 43 attached to rod 40. The rod 40 has an enlarged cylindrical section 44 which slides smoothly in sleeve 41 preventing sidewise movement of rod 40 relative to the sleeve.

The housing members 26, 27 have integrally formed thereon the fins 48, 49. Each fin has a slotted corner in which is pivotally secured one end of a flat arcuate link 50. Bolts 51, 52 anchor the ends of the link to the fins. The rod 40 extends through an opening in the hexagonal plug 53 mounted in the cylindrical section 54, located at the upper end of sleeve 41. Integrally formed on sleeve section 54 are plates 56, 57 to which are attached the longer bearing plates 58, 59 by bolts 60. The housing members 26, 27 pivot with respect to the plates 58, 59 since shafts 18, 19 pass through them. The sleeve 41 has another cylindrical section 62 to which the mutually perpendicular shafts 64, 65 are pivotally attached. Shafts 64 and 65 are connected to the fuselage or body structure (not shown) of a helicopter. Shafts 18 and 19 are likewise connected to the body structure of the helicopter and pivotally carry the shaft supports 26, 27 thereon.

In operation, rod 40 will be raised and lowered as desired. If the shaft is lowered as shown by arrow 70, cross shaft 35 will move down carrying links 36, 37. The links will pivot cranks 28, 29 and rotate shafts to a limited angular extent in equal and opposite directions. The gears 16 and 17 will rotate with shafts 18, 19 and cause gears 14 and 15 to turn. The gears 14, 15 are connected shafts 12, 13 and blades 10, 11 so that the end result is the tilting of the blades as shown by arrows 72, 73 in equal and opposite directions.

If the sleeve 41 is rotating as shown by arrow 71, the leading edges E and E' of both blades 10, 11 will be lowered to cause the helicopter to descend. If the rod 40 were raised the leading edges of the blades would rise causing the helicopter to ascend. The sleeve 41 may be driven by the engine (not shown) of the helicopter.

The automatic pitch adjustment operation of the device will now be explained. Suppose the helicopter is traveling in the direction shown by arrow 75 which may be in any compass direction. The maximum velocity of the air stream will be in the opposite direction shown by arrow 78. Blade 10 will be moving forwardly as shown by arrow 76 and blade 11 will be moving backwardly as shown by arrow 77. The maximum velocity of air will be at blade 10 since it is moving opposite to the air stream. When the helicopter has attained the desired altitude it is necessary to keep the blades rotating in a horizontal plane. Since the helicopter is supported by the air stream, air pressure will tend to raise the blade 10. As the blade 10 rises the housing or shaft support member 26 pivots on shaft 18 to cause shaft 12 and blade 10 to turn until the solid line position shown in Figs. 1 and 2 is assumed. Note that this optimum position of the blade with the leading edge E pointing directly into the wind occurs at blade position P–1 where the wind velocity with respect to the blade is highest. When the housing member 26 tilts upwardly the housing member 27 tilts downwardly since it is connected by link 50 to housing member 26. When member 27 tilts downwardly a relative rotation of shafts 13 and 19 occurs which raises the leading edge E' of blade 11 at position P–2 so that it points directly downwind. The movement of blade 10 controls the movement of blade 11 rather than vice versa because the maximum wind force occurs on blade 10 which is opposing the movement of the air stream. If the helicopter is hovering in air and not moving in any compass direction, then blade 10 will still control the leveling adjustment as long as its leading edge E is lower than leading edge E'. Thus if the helicopter should tend to tilt from a stable horizontal position while hovering in air so that the tilted dotted line positions of the several members as shown in Fig. 2 are assumed, a counter leveling action of the housing members and blades at once occurs as explained above. Blade 10 rises and turns its leading edge into the wind, while blade 11 descends and turns its leading edge downwind to stabilize the helicopter and level the positions of the blades.

By suitably presetting the pitches of blades 10, 11 the present invention may serve to increase automatically the bite of one blade while decreasing the bite of the other blade in moving the helicopter. For example, suppose blade 10 were horizontal and blade 11 were tilted while in positions P-1 and P-2 respectively. Blade 10 would be offering minimum wind resistance and blade 11 would be paddling or pushing the air with maximum force. As the blades rotated in a horizontal plane, blade 11 would automatically turn on shaft 13 and assume a horizontal position for minimum bite at P-1 while blade 10 would turn on shaft 12 to maximum bite at P-2, and at intermediate positions between P-1 and P-2 in each cycle of rotation on sleeve 41, the blades would assume intermediate tilted positions for maximum effectiveness in moving the helicopter. This automatic tilting of the blades as they rotated would constitute an automatic cycling pitch adjustment.

Although a single embodiment of the invention has been disclosed, it will be readily apparent to those skilled in the art that many changes are possible without departing from the invention as defined by the scope of the appended claim.

What is claimed and desired to protect by Letters Patent of the United States is:

In a helicopter having a main drive shaft which is normally disposed in generally vertical position and a pair of wing blades which are connected to said main drive shaft for rotation, normally, in a generally horizontal plane, a supporting frame, a second frame rotatably mounted on the first frame coaxially with said drive shaft, connecting means between said second frame and said drive shaft whereby rotary movement of the drive shaft relative to the first frame causes a corresponding rotary movement of the second frame relative to the first frame, a pair of horizontal pivots supported on opposite sides of the second frame, a pair of housings mounted on said horizontal pivots for pivotal movement about said horizontal pivots and relative to said second frame, a pair of shafts projecting radially outwardly from said housings, said shafts being adapted to rotate about their longitudinal axes relative to their respective housings, a pair of wing blades secured to said shafts, a linkage connecting the two housings, a pair of gears on said shafts, a second pair of gears engaging said first pair of gears, said second pair of gears being coaxial with said pivots, and control means connected to said second pair of gears for rotating them and thereby rotating the first pair of gears in order to change the pitch of the blades, whereby any relative vertical movement between the two blades about their respective axes causes a change in pitch of said blades by reason of the engagement of the first pair of gears with the second pair of gears which are situated coaxially with said pivots.

References Cited in the file of this patent
UNITED STATES PATENTS

| | | |
|---|---|---|
| 1,986,709 | Brequest et al. | Jan. 1, 1935 |
| 2,380,581 | Prewitt | July 31, 1945 |